Patented July 27, 1926.

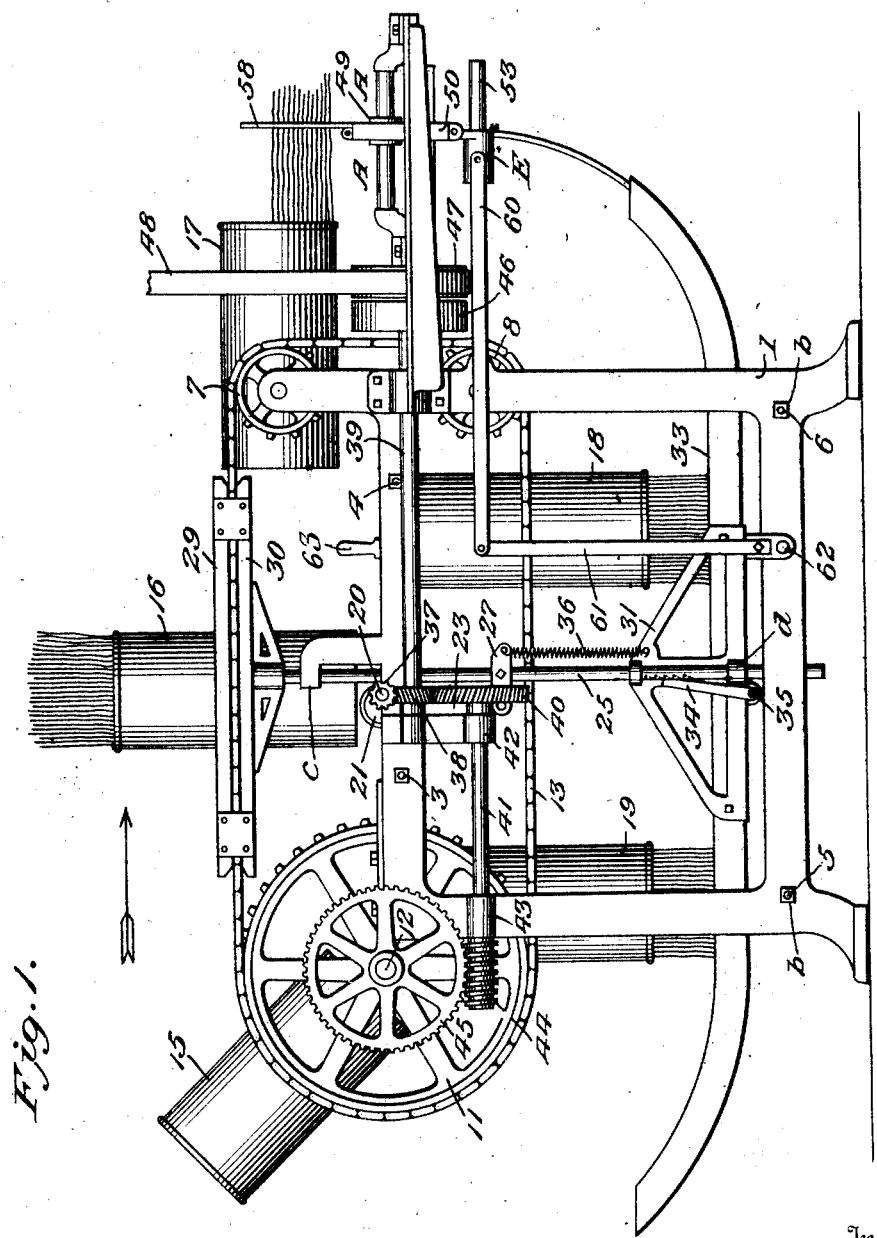

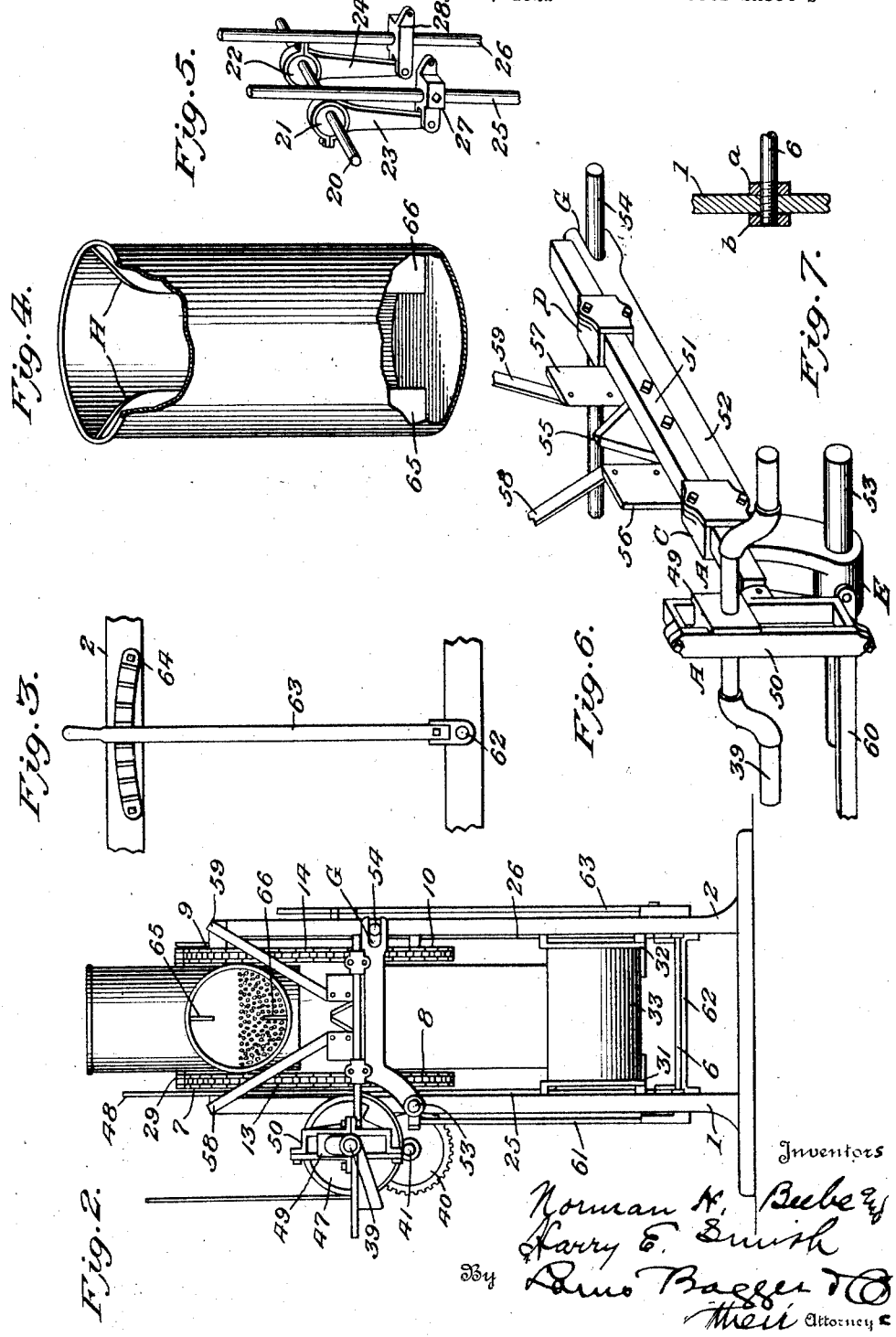

1,594,237

UNITED STATES PATENT OFFICE.

NORMAN H. BEEBE AND HARRY E. SMITH, OF DAVENPORT, IOWA, ASSIGNORS TO MODERN BROOM MACHINERY COMPANY, OF DAVENPORT, IOWA, A CORPORATION OF IOWA.

EVENER AND CUTTER.

Application filed May 15, 1922. Serial No. 561,231.

Our invention relates to an improvement in eveners and cutters.

This invention is a machine, the primary functions of which are to bring to the same plane one end of each fiber or stalk composing a bundle, and then cut all of the opposite end even. The cutting mechanism is movable to enable the operator to cut the fiber the length he may desire. The fibers are brought to the same plane by vibrating vertically the containers in which the fiber is placed.

After the fiber has been cut to length by the cutting device, the containers are inverted so the cut ends of the fiber rest on and move over a vibrating pan so that any fiber which is too short to reach the cutter will be vibrated or jolted down even with the cut ends. The vibrating pan can be moved vertically to or from the containers to successfully handle fiber of various lengths.

The operation of the machine will be apparent, as the details of its construction are explained.

In the accompanying drawings:

Figure 1 is a side elevation of the complete machine.

Fig. 2 is a front elevation of the same.

Fig. 3 is a detached view of the shifting lever and related parts.

Fig. 4 is a view in perspective of one of the containers, portions being broken away to show the internal construction.

Fig. 5 is a detached perspective view of the vibrating eccentrics and related parts.

Fig. 6 is a perspective view of the cutting mechanism, and

Fig. 7 is a detail.

Numbers 1 and 2 are the side members of the main frame. These frame members are retained in their relative positions by the rods 3, 4, 5 and 6. The rods are provided with two nuts at either end, one nut $a$ inside and one $b$ outside of the frame members, thus keeping the same properly spaced on the rods, as shown in Fig. 7.

The sprocket wheels 7 and 8 are notably attached to frame member 1. A similar pair of sprocket wheels, 9 and 10, are attached in like manner to frame member 2. A relatively large pair of sprocket wheels, one of which is indicated by number 11, are mounted on and revolve in unison with shaft 12.

The endless sprocket chains 13 and 14 operate on the above described sprocket wheels as shown. The sprocket chains are each provided with attachment links at suitable intervals.

Cans or containers indicated by numbers 15, 16, 17, 18 and 19 are attached to the chains by means of the attachment links as shown. These cans move in unison with the chains and in the direction indicated by the arrow in Fig. 1.

The shaft 20 revolves within bearings, one of which is formed integral with frame member 1 and the other with member 2.

Mounted upon and revolving with the shaft 20 are two eccentrics 21 and 22. The eccentric straps 23 and 24 are operatively attached to the vibrating rods 25 and 26 by the brackets 27 and 28.

The rods 25 and 26 are each slidably held within bearings $c$ and $d$ formed integral with frame members 1 and 2. Secured to the upper end of rod 25 are the bars 29 and 30. These bars are spaced apart the proper distance to permit the chain 13 moving horizontally between them. A similar pair of bars are in like manner secured to the rod 26.

The pan bracket 31 is slidably attached to the vibrating rod 25. A similar bracket 32 is in like manner attached to rod 26. Brackets 31 and 32 are rigidly attached to the pan 33.

A pawl 34 is pivotally attached at its lower end to bracket 31. The upper end of the pawl engages notches in the rod 25. A similar pawl is in the same manner attached to bracket 32 and engages notches in the rod 26. Both pawls are attached to shaft 35 and operate in unison. A tension spring 36 is attached to bracket 27 at one of its ends and the pan bracket at its opposite end. A similar spring extends from bracket 28 to bracket 32. The tension of the two springs is approximately equal to the weight of the pan and bracket.

A spiral gear 37 is secured to shaft 20 and meshes with a spiral gear 38. The gear 38 is secured to crank shaft 39. A spiral gear 40 is attached to shaft 41 and meshes with gear 38. Shaft 41 is rotatably held within bearings 42 and 43. A long worm 44 is secured to shaft 41. This worm meshes with the worm wheel 45. Worm wheel 45 is attached to shaft 12. Pulley 46 is a loose pulley revolving about crank shaft 39. Pulley 47 is attached to and revolves with shaft 39. The belt 48 operates on pulley 47 to impart motion to the entire machine through the mechanism described.

Crank shaft 39 is provided with a relatively long crank pin as shown at AA. A link block 49 is rotatably mounted on the crank pin of the crank shaft 39. This block is provided with flanges which serve to keep it within the link 50, and permit it to slide vertically within the link 50.

The link 50 is attached to the sickle bar 51. This bar is slidably held within bearings C and D of the sickle frame 52.

The sickle frame 52 is provided with a round extension E. This round extension E is free to slide horizontally on the rod 53. The rod 53 is attached to the horizontally reciprocating frame member 1. The opposite end of the sickle frame 52 is provided with a slot G which permits the frame to slide horizontally upon the rod 54. The rod 54 is attached to frame member 2.

A cutting blade 55 is attached to the sickle bar 51. Two stationary cutting blades numbers 56 and 57 are attached to sickle frame 52. The fiber guides 58 and 59 are attached to the cutting blades 56 and 57 as shown.

A reach rod 60 is movably secured at one of its ends to the extension E of the sickle frame 52 and at its opposite end to the arm 61. The arm 61 is attached to the shaft 62. The shaft 62 is free to rotate within bearings made integral with the frame members 1 and 2. The adjusting lever 63 is attached to the opposite end of shaft 62. The upper end of the lever 63 rests within notches as shown in Fig. 3. The plate 64 is provided with a series of notches and is attached to frame member 2. By springing the lever out of one notch, it may be moved to any other. Each notch is numbered to correspond with the length the fiber will be cut when in that particular adjustment.

Each container is provided with one or more fins 65 and 66. These fins or partial partitions are secured to the bottom as well as the side portion and extend practically the entire length of the container. The inner corners H are preferably rounded as shown in Fig. 4. The fins serve to retain the fiber in proper vertical position while vibrating.

The operation of the machine is as follows: Motion is imparted to the crank shaft 39 by means of the belt 48 and pulley 47. As the crank shaft 39 revolves in its bearings, rotating the crank-pin A—A to give a reciprocating vertical movement to the block 49 within the link 50 while simultaneously reciprocating the link 50 and its attached sickle-bar 51 horizontally, a reciprocating motion is imparted to the cutter 55. As the containers descend, the fiber in them is brought between the stationary cutters and the reciprocating cutter, thus being sheared to length. By means of the shifter lever 63 and the intervening mechanism described, the cutter frame 52 and dependent parts may be made to approach or recede from the containers, thus varying the length the fiber is cut, to suit the operator.

By means of gears already described, shaft 39 imparts motion to shaft 20. Shaft 20 causes the eccentrics to revolve, thus imparting a vertical vibratory motion to the rods 25 and 26. These rods impart their vibratory motion to the containers by means of bars and chain as before explained. The vibratory motion jolts the lower ends of the fiber down on the bottom of each container as it moves horizontally on its way to the cutter.

Shaft 39 imparts motion to the shaft 12 through the medium of the worm wheel 45, the worm 44, the shaft 41, the gear 40 and the gear 38. As shaft 12 rotates the sprockets attached thereto revolve imparting motion to the chain to which the containers are attached.

When the fiber is being cut short it is advisable to raise the pan and when the fiber is relatively long, it becomes necessary to lower the same. To accomplish this, the operator pushes one of the pawls out of the notch it is resting in then raises or lowers the pan as desired.

We claim:

1. The combination of a traveling conveyer, an agitator platform arranged adjacent said conveyer, a drive shaft, supporting bars for said platform, means for resiliently suspending said platform from said supporting bars, said supporting bars having notches therein, pawls connected with said platform in position to engage the notches for adjusting the platform relative to the bars, eccentrics fixed on the drive-shaft, and brackets connected with the supporting bars and operatively connected with the eccentrics for suspending the bars therefrom, to cause an agitation of the platform upon a rotation of the drive-shaft.

2. A machine of the character described including a conveyer, a cutting frame, and means for adjusting the position of the cutting frame relative to the conveyer including a reach-rod connected with said frame, an arm pivotally connected with said reach rod, a rock-shaft to which said arm is secured, and means for actuating said rock-shaft.

3. The combination with a frame, sprocket wheels, chains, containers connected with and carried by the chains, bars between which the chains pass, rods to which the bars are secured, a shaft having eccentrics thereon, means extending from the eccentrics to the rods for reciprocating the latter as the shaft is rotated, a crank shaft, gearing for transmitting motion from said crank shaft to the sprocket wheel and chains, a reciprocating cutter actuated by the crank shaft, and means for driving said crank shaft.

4. A machine of the character described, including an endless conveyor and containers carried thereby, rods supported on each side of the machine, a frame slidably mounted on said rods, a cutter supported by said frame, and means for adjusting the position of the cutter and frame with relation to the ends of the containers, said means comprising a reach rod connected with the frame, an arm attached to the reach rod, a shaft to which said arm is secured and a lever connected with the shaft.

In testimony whereof we hereunto affix our signatures.

NORMAN H. BEEBE.
HARRY E. SMITH.